July 6, 1965
W. E. HENDRICKS
3,193,305
FRONT WHEEL DRIVE FOR BICYCLES
Filed Nov. 5, 1962
2 Sheets-Sheet 1
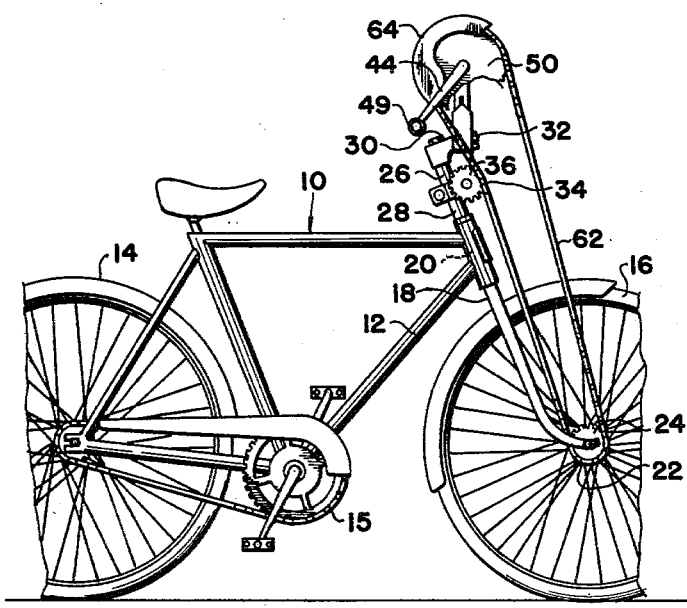
FIG. 1
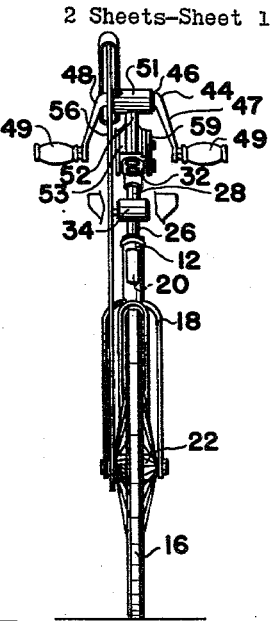
FIG. 2
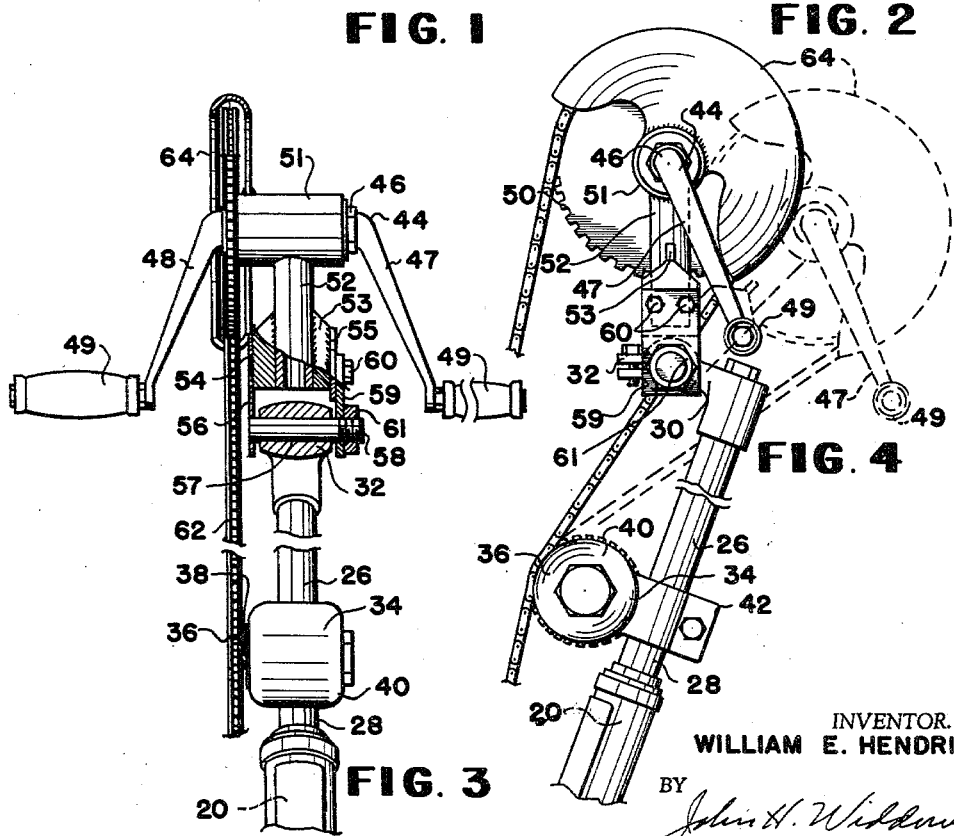
FIG. 3
FIG. 4
INVENTOR.
WILLIAM E. HENDRICKS
BY
*John H. Wilkinson*
ATTORNEY July 6, 1965  W. E. HENDRICKS  3,193,305
FRONT WHEEL DRIVE FOR BICYCLES
Filed Nov. 5, 1962  2 Sheets-Sheet 2
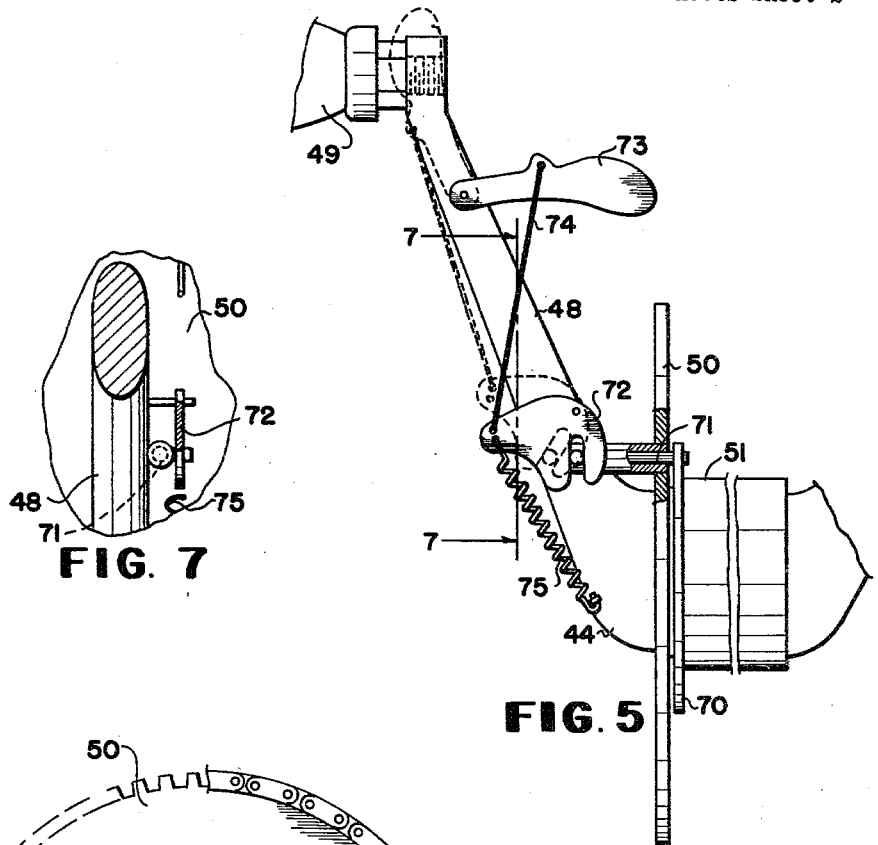
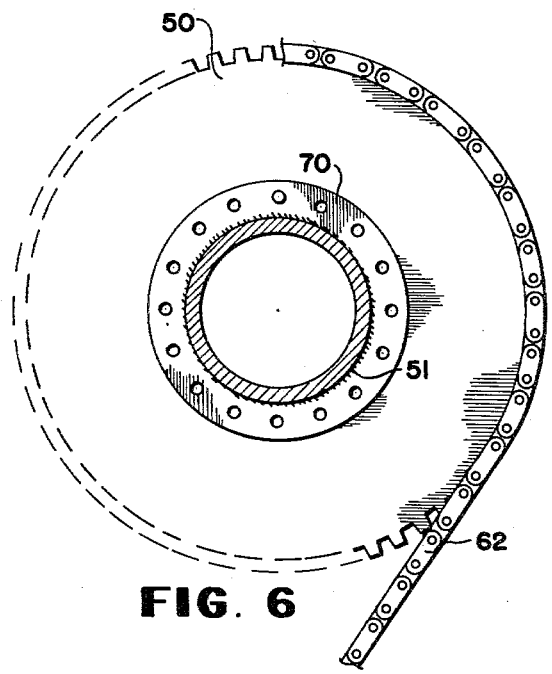
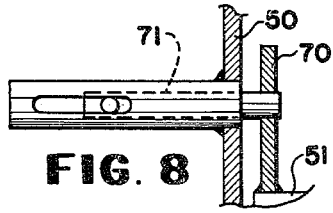
INVENTOR.
WILLIAM E. HENDRICKS
BY
ATTORNEY

United States Patent Office 3,193,305
Patented July 6, 1965

3,193,305
FRONT WHEEL DRIVE FOR BICYCLES
William E. Hendricks, 614 S. Minnesota, Wichita, Kans.
Filed Nov. 5, 1962, Ser. No. 235,390
7 Claims. (Cl. 280—225)

This invention relates to velocipedes. In a more specific aspect this invention relates to a front wheel drive for a bicycle or velocipede. In another aspect, this invention relates to a binary drive bicycle or velocipede having a foot powered drive means for the rear wheel and a hand powered drive means for the front wheel. In still another aspect, this invention relates to a front wheel drive means adapted to convert a conventional bicycle to a binary drive bicycle with a minimum of modification. Still more specifically this invention relates to a front wheel drive for a bicycle that is adjustable to suit the individual rider, and also permits a large swiveling angle for the front fork. This invention further relates to a drive means for a bicycle that is simple to manufacture and install.

The more conventional velocipedes and bicycles utilize a crank mechanism, adapted to be turned by the legs of a rider, operatively connected to a rear wheel to propel them. This drive means, though simple and dependable in operation, has the physical effect of over exerting and over developing the leg muscles of a rider, while leaving the upper body muscles including the arms, wrists and shoulder muscles in an underdeveloped state. Velocipedes and bicycles are known in the prior art that have both foot powered and arm powered driving means. These bicycles and velocipedes, provided with a binary drive using both the legs and the arms, have the desirable effect of developing the muscles throughout the body of a rider but have not been widely used or accepted.

The binary drive bicycles and velocipedes known to the prior art have a number of very serious deficiencies that limit their practicability. Ordinarily in a front wheel drive a crank mechanism is mounted above the front fork within reach of the arms of a rider. Some form of driving connection, usually a sprocket chain, connects the crank mechanism with the front wheel of the bicycle. This necessary driving means has, in the bicycles of the prior art having a front wheel drive, seriously interfered with the steering of the bicycle because it limited the degree of swiveling of the fork. Further, this deficiency made riding a binary drive cycle difficult if not hazardous. Efforts were made to overcome this interference such as forming the frame to allow clearance of the chain or connecting means, and/or also moving the crank ahead of the fork. These efforts were unsuccessful because designing the frame to allow for the clearance of the chain made the frame of the bicycle quite expensive and also weakened its structure. Moving the crank ahead of the fork of the bicycle made the crank virtually inaccessible, particularly if a rider was small in stature. These bicycles were unstable, hard to maneuver, and uncomfortable to ride.

Further, the hand driven front wheel drive for bicycles known to the prior art could not be adjusted to accommodate riders of different physical sizes, stature, etc. In order to produce a comfortable bicycle suited to the rider the bicycle thus had to be practically custom made. This of course made the bicycles very expensive and seriously limited their acceptance and use.

None of the front wheel driving means known to the prior art could be easily and simply installed on a conventional bicycle having only a foot-powered driving means. The known front wheel driving means requires elaborate modifications of the existing structure of the conventional bicycle and replacement of many of the original parts. The expense of converting a conventional bicycle to a binary drive bicycle was so expensive as to make the conversion prohibitive.

The hand-powered front wheel drives of the known bicycles cannot be easily and simply converted while riding to a fixed handle bar type of operation in the event that the rider does not wish to avail himself of the hand-powered drive means.

I have overcome the great aforementioned disadvantages of the binary drive bicycles and velocipedes of the prior art. The front wheel drive structure of my invention has proven completely free of these problems in operation. The hand powered front wheel drive means of my invention allows the adjustment of the crank means to suit the individual rider, allows extensive swiveling of the front fork of the bicycle, and adapts the crank mechanism to alternately serve as fixed handle bars.

The new binary drive velocipede of my invention has a frame, a rear wheel, a drive means for said rear wheel, a front wheel, and a drive means for the front wheel. The drive means for the front wheel preferably has an adjustable crank means, a connecting means for the crank means and front wheel for maintaining them in driving relationship, and a means mounted on the velocipede to maintain the connecting means out of contact with the frame during operation of the velocipede. Preferably, the connecting means is a sprocket chain and sprocket mounted on the front wheel. Preferably the means mountable on the velocipede to maintain the connecting means out of contact with the frame and the front fork is an idler means mounted intermediate the crank means and the sprocket on the front wheel.

The new drive means of my invention is adaptable for mounting on a velocipede having a frame, a rear wheel, drive means for the rear wheel, and a front wheel, to convert the velocipede to a binary drive velocipede. The drive means for a velocipede and the like of my invention has a drive means mountable on the front wheel, a drive means for the front wheel mountable on the frame, a connecting means operatively connectable to the two last-mentioned drive means, when these drive means are mounted on the velocipede, to provide for driving the front wheel of the bicycle, and other means mountable on said velocipede to, when mounted, maintain the connecting drive means out of engagement with the velocipede frame during operation of same. Preferably the drive means mountable on the front wheel is a sprocket or coaster brake assembly. Preferably the drive means for the front wheel mountable on the frame is an adjustably mounted crank means. Preferably the connecting means operatively connectable to the aforementioned drive means is a chain for the sprockets. And, said other means mountable on the velocipede to maintain the connecting drive means out of engagement with the velocipede frame is an idler means mounted intermediate the two aforementioned drive means and engaging the connecting means or chain. It is contemplated that the drive means of my invention could further be advantageously utilized in velocipedes having front wheel foot powered driving means, as for example on a child's tricycle.

The new binary drive velocipede and the new front wheel drive means of my invention overcomes all the aforementioned problems relating to velocipedes and bicycles of the prior art. The front wheel drive means, when installed on a bicycle or velocipede, allows the fork to swivel extensively thus giving the rider a greater degree of control over the bicycle or velocipede. This makes the bicycle safer and easier to manipulate and ride. The front wheel drive can be installed in a bicycle or velocipede without extensive modifications of the frame or structure of the bicycle. The frame is therefore stronger, less expensive and safer than the binary drive bicycles known to the prior art. The crank mechanism of my binary drive bicycle or hand powered drive means of my invention can be readily adjusted to accommodate riders of different size, stature etc. By providing this adjustment the binary drive bicycle is rendered safer, more comfortable to ride and adapted for use and enjoyment of a greater number of people. The drive means of my invention is easy and simple to install and adapted to inexpensively convert a conventional bicycle having only a foot powered drive to a binary drive bicycle having both foot powered and arm powered drive means. This modification or conversion can be made simply without elaborate modification of the bicycle using very nearly all of the original parts. This makes the modification inexpensive and readily available to all who own a bicycle. Further, the drive means of my invention is adapted to alternately serve as a second drive means or serve as fixed handle bars that are selectively adjustable in predetermined positions. This feature is important because it makes the binary drive bicycle of my invention adaptable to a greater variety of conditions and uses. For example, a novice rider desires to use the front wheel drive only when underway, depending on fixed handle bars to facilitate starting.

It is an object of this invention to provide a new drive means for a velocipede or the like.

It is another object of this invention to provide a new binary drive velocipede.

It is still another object of this invention to provide a front wheel drive means for a bicycle that is adjustable.

Still another object of this invention is to provide a front wheel drive means for a bicycle that permits greater swiveling of the front fork.

Yet another object of this invention is to provide a front wheel drive means that is adapted to be installed on a conventional bicycle and utilize very nearly all of the original parts.

Still another object of this invention is to provide a front wheel drive means that will alternately serve as a hand powered drive means or as fixed handle bars.

Yet another object of this invention is to provide a simple, practical inexpensive front wheel arm propelled drive to supplement and augment but not to replace the conventional foot-powered drive, thus providing means to completely, periodically relieve tired leg muscles and provide additional effective torque when used concurrently with the foot propelled drive mechanism.

Yet another object of this invention is to provide a front wheel drive means available in kit form that is easy to manufacture, simple to install on a conventional bicycle, and is dependable and trouble-free in operation.

Yet another object of this invention is to provide a binary drive bicycle provided with a hand-powered drive means for the front wheel that is adjustable to accommodate riders of varying size and stature and permit extended swiveling of the front fork.

Other objects and advantages of the new binary drive velocipede and front wheel drive of my invention will become apparent to those skilled in the art upon reading the disclosure.

Drawings accompany and are a part of this disclosure. These drawings depict preferred specific embodiments of the new binary drive velocipede and front wheel drive of my invention and it is to be understood that such drawings are not to unduly limit the scope of my invention. In the drawings, FIG. 1 is a front elevational view showing a preferred specific embodiment of the binary drive bicycle combination of my invention.

FIG. 2 is a front elevational view of FIG. 1.

FIG. 3 is an enlarged front elevational view of a preferred specific embodiment of the crank means and idler means of the front wheel drive of my invention.

FIG. 4 is a side elevational view of the structure shown in FIG. 3 illustrating in dotted lines an adjusted position of the crank mechanism.

FIG. 5 is a fragmentary enlarged view of a preferred specific embodiment of the crank mechanism of my invention showing a specific embodiment of locking means for locking the crank mechanism in a fixed position.

FIG. 6 is a view showing the specific relationship and construction of an apertured plate as an element in the locking means shown in FIG. 5.

FIG. 7 is a cross sectional fragmentary view taken on line 7—7 of FIG. 5.

FIG. 8 is a fragmentary view showing specific details of the crank means locking mechanism of my invention.

The following is a discussion and description of the new binary drive bicycle and hand powered front wheel drive means of my invention made with reference to the drawings wherein the same reference numerals are used to indicate the same or similar parts and/or structure. The discussion and description is of preferred specific embodiments of the new bicycle structure of my invention, and it is to be understood that such is not to unduly limit the scope of my invention.

Referring now to the drawings, FIGS. 1 through 8, bicycle 10 is a preferred specific embodiment of the new binary drive bicycle structure and front wheel drive structure of my invention. The binary drive bicycle 10 has a frame 12, a rear wheel 14, a rear wheel drive means 15, a front wheel 16, and a front wheel fork member 18 rotatably mounted on frame 12. The aforementioned elements are conventional elements normally found on a conventional two wheel mono-drive bicycle. The fork member 18 is provided with a hollow upwardly extending tubular shaft 20 (not shown but disposed in the front tubular portion of the frame) rigidly attached and part of the fork member 18. My binary drive bicycle 10 has a hand driven front wheel drive means comprised of a coaster brake assembly 22 operatively mounted on front wheel 16 and constituting the axle of same. The coaster brake assembly 22 can be provided with two or more speeds in a manner known to the art or alternatively can have a single speed. A sprocket 24 is operatively attached to the coaster brake axle assembly. In alternative this sprocket can be rigidly attached to the front wheel in any suitable manner if desired. A stem means 26 comprising an elongated tubular portion 28 having an upper end and a lower end and an expansion means on the lower end (not shown) adapted to be disposed in the hollow tubular shaft 20 of the fork means securing same in assembled relation. This stem means is a conventional element in a bicycle and is ordinarily used to secure the handle bars to the front wheel fork. The stem means 26 has an integral off-setting portion 30 on the upper end and an annular clamping means 32 on off-setting portion 30, which in a conventional bicycle is adapted to hold and secure the handle bars. An idler means 34 is adjustably mounted on the stem means 26. The idler means 34 is comprised of an idler sprocket 36, a shaft 38, a shaft support means 40 and a clamping means 42 on said shaft support means 40 adapted to encircle the stem means 26. The idler sprocket 36 is preferably rigidly mounted on shaft 38 with the shaft 38 rotatably mounted in shaft support means 40. The clamping means 42 can be used to adjustably position the idler means on any desired portion of the stem means 26. Any other suitable means for rotatably mounting the sprocket 36 can be used. A crank means 44 adapted to be turned by the rider by gripping same and turning thus imparting driving energy to the front wheel of the bicycle is provided. The crank means is comprised of a shaft portion 46 and two opposed leg portions 47 and 48 each integrally joined at one end to an end of the shaft portion 46 in generally transverse relationship therewith. The shaft portion 46 and leg portions 47 and 48 form a generally U-shaped configuration. The crank means can have oppositely extending leg portions, as in foot powered cranks, if desired. Further, the crank means can be formed of separate shaft and leg portions suitably joined if desired. Tubular handle elements 49 are rotatably mounted on the opposite ends of each leg portion 47 and 48 and extend parallel to the longitudinal axis of the shaft portion 46. A relatively large sprocket 50 is fixedly mounted to said crank 44 adjacent to one of said leg portions. The sprocket 50 is shown adjacent to leg portion 48 in the preferred specific embodiment. When mounted the relatively large sprocket 50, idler sprocket 36 and coaster brake sprocket 24 are positioned in a single plane that is off-set from the tubular portion 20 of the fork means 18. An adjustable mounting means, clearly illustrated in FIG. 3, for said crank means 44 is provided and consists of a horizontally extending bearing means 51 to rotatably support the crank means. A generally upright elongated rod portion 52 having upper and lower ends is integrally joined at its upper end to the bearing means 51, and provided with an enlarged portion 53 on the lower end. The enlarged portion 53 is provided with flat parallel surfaces 54 and 55 which are spaced a distance greater than the width of clamp means 32 of the off-set portion of the stem means 26 as clearly shown in FIG. 3. A flat downwardly extending plate 56 is rigidly secured to said surface 54 and has a portion extending beyond the lower end of rod portion 52. A relatively short shaft 57 having a threaded end 58 is rigidly attached to the extending end portion of plate 56. A second plate 59 provided with an opening on the first lower end adapted to receive the relatively short shaft is affixed to the surface 55 on the elongated portion 53 by a bolt means 60. A threaded nut means 61 is threadedly mounted on short shaft 57, and aids in securing plate 59 in assembled relation. The extra clearance between plates 56 and 59 in excess of the width of clamping element 32 allows the crank means support to be shifted laterally allowing an alignment between the sprocket 50 and the coaster brake sprocket 24. Further, the crank means support can be pivoted about shaft 57, supported in clamping means 32, to selectively position the crank means in numerous desirable positions one of which is shown in FIG. 4 in dotted lines to accommodate various sized riders. This adjustment allows the rider to select a desirable comfortable operative position for the crank means to allow for differences in physical size and stature thus adapting the bicycle for use of individuals having widely different physical make up. The adjustment is important when the rider converts the drive means to a fixed handlebar, as will be explained below. These alternate functions may necessitate a different position of the crank relative to the frame. A sprocket chain 62 connects the sprocket 24 and the crank means sprocket 50 in driving relationship. The chain 62 is looped over idler sprocket 36 which supports and guides the chain in a desirable position to prevent its contacting the frame 12, particularly when the front wheel fork is swiveled as in turning a corner and the like. The swivel sprocket 36 in addition to making possible an extended swiveling arc of the front fork additionally makes possible an adjustment of the crank means which was referred to previously. Preferably the crank means sprocket and sprocket chain are provided with a chain guard 64 which can be secured in position with any suitable means.

The preferred specific embodiment of my front wheel drive can be provided with a preferred embodiment of lock means to secure the crank in a fixed position to serve as fixed handle bars. This lock means consists of an annular apertured flange ring 70 rigidly mounted on the bearing means 51 for the crank and is in close proximity to the relatively large sprocket 50 as clearly shown in FIG. 5. A plunger lock means 71 is mounted on the relatively large sprocket 50 and adapted to selectively engage the apertured flange ring 70. A camming lever 72 is pivotally mounted on a leg portion 48 of the crank means and is operatively connected to the plunger lock means 71. On the same leg portion 48 in a position adjacent the handle 49 is provided a snap lock lever 73. A linking means 74 connects the snap lock lever 73 and the camming lever 72 in operative relation. A spring means 75 urges the camming lever 72 in a direction opposite the pull of snap lock lever 73. The alternate position of the locking means is shown in dotted lines in FIG. 5. When lever 73 is depressed to a position shown in the dotted line the plunger 71 is retracted from the apertured ring 70 and the crank means 46 can be used as a hand powered front wheel drive means. When the lever 73 is moved to the position shown in the solid lines in FIG. 5 the plunger means 71 is forced outwardly by spring 75 and cam lever 72 into engagement with the apertured ring 70 locking the crank means in a desired position to serve as fixed handle bars.

The binary drive bicycle of my invention can be used in any desirable manner. The rear wheel drive can be used singly or in combination with the front wheel drive. The front wheel drive can be used as a fixed handle bar, as a drive means, or as a braking means. If the front wheel coaster brake assembly is provided with a number of shifts, many various driving combinations between the front and rear wheel drives are possible which give the rider any desired distribution of exercise by throwing the driving load either on the front or rear wheels of the bicycle.

The front wheel drive of my invention can be very conveniently manufactured and sold in a kit form which can be installed on virtually any conventional mono-drive bicycle. The preferred specific embodiment of my kit would include a coaster brake assembly to be installed in the front wheel, a sprocket chain, an idler means, a crank means and the crank means support. In order to install the kit, all that would be necessary would be to remove the front wheel axle and replace it with the coaster brake assembly, then remove the handlebars from the stem and replace with the crank means and crank means support assembly positioning the relatively short shaft 57 in the handlebar clamp. The stem can be raised if necessary or possibly replaced with a longer stem. Then the idler means is clamped in position on the stem. The chain is placed on the sprockets and the various elements adjusted if necessary. The complete assembly operation can be accomplished in a minimum of time.

As will be obvious to those skilled in the art various changes and modifications of the preferred binary drive bicycle and hand powered front wheel drive disclosed herein can be made or followed without departing from the spirit of the disclosure or from the scope of the claims.

I claim:

1. A binary drive bicycle comprising, a frame, a rear wheel, a foot-powered drive means for said rear wheel, a front wheel, a fork member for said front wheel rotatably mounted on said frame, said fork member provided with a hollow upwardly extending tubular shaft, a hand-driven front wheel drive means comprising, a coaster brake axle assembly operatively mounted on said front wheel, a sprocket for said coaster brake assembly, a stem means disposed on said tubular shaft of said fork member, said stem means comprising an elongated tubular portion having an upper end and a lower end, an expansion means on said lower end adapted to be disposed in said hollow tubular shaft of said fork means and secure same in assembled relation, an integral offsetting portion on said upper end and an annular clamp means on said offsetting portion, an idler means mounted on said stem means comprising, an idler sprocket, a shaft, a shaft support means for said last-mentioned shaft, and a clamping means on said shaft support means adapted to encircle said stem means, said idler sprocket mounted on said last-mentioned shaft, a crank means comprising, a shaft portion, two opposed leg portions each integrally joined at one end to an end of said shaft portion in generally transverse relationship therewith, said shaft portion and said leg portions forming a generally U-shaped configuration, and handle elements rotatably mounted on the free ends of the leg portions, a relatively large sprocket fixedly mounted on said crank means adjacent one of said leg portions, an adjustable mounting means for said crank means comprising, a horizontally extending bearing means to rotatably support said crank means, a generally upright elongated rod portion having upper and lower ends integrally joined at its upper end to said bearing means for said crank means, an enlarged portion on said lower end of said upright elongated rod portion, flat parallel surfaces on said enlarged portion spaced a distance greater than the width of said clamp means on said offset portion of the stem means, a flat downwardly extending plate rigidly secured to one of said surfaces, a relatively short shaft means attached to said plate, a second plate provided with an opening on a first end adapted to receive said relatively short shaft, bolt means adapted to secure said second plate to the other of said flat surfaces, a sprocket chain for connecting said sprocket on said coaster brake assembly and said relatively large sprocket on said crank in driving relationship, a means to lock said crank means in a fixed position comprising, an annular apertured flange ring rigidly mounted on said bearing means for said crank means and in close proximity to said relatively large sprocket, a plunger lock means mounted on said relatively large sprocket adapted to selectively engage the apertured flange ring, a camming lever pivotally mounted on a leg portion of said crank means and operatively connected to said plunger lock means, a snap lock lever mounted on the same leg portion of said crank means in close proximity to said handle means, a linking means connecting said snap-lock lever and said camming lever, a spring means for urging said camming lever, said front wheel drive means assembled with said relatively short shaft disposed in said clamp means of said stem means and adapted to be pivotally adjusted therein to selectively position the crank means to suit the physical size of a rider seated thereon, and longitudinally adjusted therein to align the crank means with the coaster brake sprocket, said idler means operative to engage said sprocket chain intermediate said relatively large sprocket and said sprocket for said coaster brake assembly and guide and support said sprocket chain to prevent interference with said frame to thus permit extended swiveling of said fork member, and said means to lock said crank means adapted to inactivate said front wheel drive means and rigidly and adjustably secure said crank means in a predetermined position for functioning as fixed handlebars.

2. A binary drive bicycle comprising, a frame, a rear wheel, a foot powered drive means for said rear wheel, a front wheel, a fork member for said front wheel rotatably mounted on said frame, said fork member provided with a hollow upwardly extending tubular shaft, a hand driven front wheel drive means comprising, a coaster brake axle assembly operatively mounted on said front wheel and constituting the axle of same, a sprocket for said coaster brake assembly, a stem means disposed on said tubular shaft of said fork member, said stem means comprising an elongated tubular portion having an upper end and a lower end, and expansion means on said lower end adapted to be disposed in said hollow tubular shaft of said fork member and adapted to secure same in assembled relation, an integral offsetting portion, on said upper end, and an annular clamp means on said offsetting portion, an idler means mounted on said stem means comprising, an idler sprocket, a shaft, a shaft support means for said last-mentioned shaft, and a clamping means on said shaft support means adapted to encircle said stem means, said idler sprocket mounted on said last-mentioned shaft and with said last-mentioned shaft rotatably mounted on said shaft support means, a crank means comprising, a shaft portion, two opposed leg portions each integrally joined at one end to an end of said shaft portion in generally transverse relationship therewith, said shaft portion and said leg portions forming a generally U-shaped configuration, and tubular handle elements rotatably mounted on the free ends of said leg portions extending parallel to the longitudinal axis of said shaft portion, a relatively large sprocket fixedly mounted on said crank means adjacent to one of said leg portions, an adjustable mounting means for said crank means comprising, a horizontally extending bearing means to rotatably support said crank means, a generally upright elongated rod portion having an upper end and a lower end integrally joined at its upper end to said horizontal bearing means for said crank means, an enlarged portion on said lower end of said upright elongated rod portion, flat parallel surfaces on said enlarged portion spaced a distance greater than the width of said clamp means on said offset portion of the stem means, a flat downwardly extending plate rigidly secured to one of said surfaces having a portion extending beyond the lower end of said rod portion, a relatively short shaft means having a threaded end and rigidly attached to the extending portion of said plate at a second end opposite said threaded end in transverse relationship therewith, a second plate provided with an opening on a first end adapted to receive said relatively short shaft, means adapted to secure said second plate to the other of said flat surfaces on said enlarged portion, a sprocket chain for connecting said sprocket on said coaster brake assembly and said relatively large sprocket on said crank in driving relationship, said front wheel drive means assembled with said relatively short shaft disposed in said clamp means on said stem means and adapted to be pivotally adjusted therein to selectively position the crank means to suit the physical size and stature of a rider seated thereon, and laterally adjusted therein to align the crank means with the coaster brake sprocket, and said idler means operative to engage said sprocket chain and support and guide same to prevent interference with said frame and to permit extended swiveling of said fork member.

3. A binary drive bicycle comprising, a frame, a rear wheel, a foot powered drive means for said rear wheel, a front wheel, a fork member for said front wheel rotatably mounted on said frame, said fork member provided with a hollow upwardly extending tubular shaft, a front wheel drive means comprising, a sprocket mounted on said front wheel, stem means connected to said tubular shaft of said fork member, an integral offsetting portion on said stem means provided with an annular clamp means having a horizontal axis, an idler means mounted on said stem means comprising, an idler sprocket, a means to rotatably support said sprocket, a crank means comprising, a shaft portion, leg portions intergrally joined to each end of said shaft portion, handle elements mounted on each leg portion, a sprocket mounted on said crank means adjacent to one of said leg portions, an adjustable mounting means for said crank means comprising, a bearing means for said crank means, support means pivotally mounting said bearing means to said annular clamp means providing selective forward and rearward position adjustment of said crank means on said stem means, a sprocket chain for connecting said sprocket on said front wheel and said relatively large sprocket on said crank in driving relationship, said front wheel drive means assembled with said crank means selectively positionable relative to the bicycle frame, and with said idler means operative to engage said sprocket chain and guide and support said sprocket chain to prevent interference with said frame to thus permit extended swiveling of said fork and also make possible the crank means position adjustment.

4. A binary drive bicycle comprising, a frame, a rear wheel, a foot powered drive means for said rear wheel, a front wheel, a fork member for said front wheel rotatably mounted on said frame, a hand driven front wheel drive means comprising, a sprocket mounted on said front wheel, a stem means mounted on said fork member, an idler means mounted on said stem means comprising an idler sprocket, means rotatably supporting said idler sprocket, a crank means comprising, a shaft portion, leg portions integrally joined to said shaft portions, handle elements mounted on said leg portions, a relatively large sprocket fixedly mounted on said crank means adjacent to one of said leg portions, an adjustable mounting means for said crank means comprising, a means to rotatably support said crank means, a means for pivotally mounting said last-mentioned means on said stem member providing selective forward and rearward adjustment of said crank means, a sprocket chain for connecting said sprocket on said front wheel and said relatively large sprocket on said crank in driving relationship, said front wheel drive means constructed and adapted to provide a pivotally adjustable crank means position with said idler means adapted to position and guide said sprocket chain to prevent interference with said frame to thus permit extended swiveling of said fork and also make possible said crank position adjustment.

5. In a bicycle having a frame, a rear wheel, a drive means for said rear wheel, a front wheel, a fork for said front wheel having an upwardly extending hollow shaft portion, a stem means disposed in said hollow shaft portion having an annular clamping means, the improvement of a kit comprising, in combination, a coaster brake axle assembly operatively mounted on said front wheel and constituting the axle of same, a sprocket for said coaster brake assembly, an idler means comprising, an idler sprocket, a shaft, a shaft support means, and an annular clamping means on said shaft support means adapted to secure same on said stem means in adjustable relation thereto, said idler sprocket mounted on said last-mentioned shaft with said last-mentioned shaft rotatably mounted on said shaft support means, a crank means comprising, a crank shaft portion, two opposed leg portions, each integrally joined at one end to an end of said crank shaft portion in generally transverse relationship therewith, said crank shaft portion and said leg portions forming a generally U-shaped configuration, and handle elements rotatably mounted on the opposite ends of each leg portion, a relatively large sprocket fixedly mounted on said crank means adjacent one of said leg portions, said relatively large sprocket, said idler sprocket and said sprocket for said coaster brake all mounted in a single plane that is offset from the axis of said hollow shaft of said fork means, an adjustable mounting means for said crank means comprising a horizontally extending bearing means to rotatably support said crank means, a generally upright elongated rod portion having upper and lower ends integrally joined at its upper end to said horizontal bearing means for said crank means, an enlarged portion on said lower end of said upright elongated rod portion, flat parallel surfaces on said enlarged portion, a flat downwardly extending plate rigidly secured to one of said surfaces, a relatively short shaft means rigidly attached to the extending portion of said plate, said short shaft adapted to be pivotally and adjustably mounted in said annular clamping means on said stem means, a second plate provided with an opening on a first end adapted to receive said relatively short shaft, means to secure said second plate to the other of said flat surfaces, a sprocket chain for connecting said sprocket on said coaster brake assembly and said relatively large sprocket on said crank means in driving relationship, a means to lock said crank means in a predetermined fixed position comprising, an annular apertured flange ring rigidly mounted on said bearing means for said crank and in close proximity to said relatively large sprocket, a plunger lock means mounted on said relatively large sprocket to selectively engage the apertured flange ring, a camming lever pivotally mounted on a leg of said crank means and operatively connected to said plunger lock means, a snap lock lever mounted on the same leg portion of said crank means in close proximity to said handle means, a linking means connecting said snap-lock lever and said camming lever, a spring means for urging said camming lever, said improvement constructed and adapted to provide a front wheel drive means that is adjustable to suit the physical requirements of a rider when seated on the bicycle, and adapted to prevent interference of the sprocket chain and frame and provide an extended swiveling freedom of the fork with the provision of said idler means to guide and support said chain, and provide a means to lock the crank means in a rigid position to alternately serve as fixed handlebars.

6. In a bicycle having a frame, a rear wheel, a drive means for said rear wheel, a front wheel, a swivelly mounted fork for said front wheel, and a stem means disposed on said front wheel fork, the improvement comprising, in combination, a coaster brake assembly having a sprocket and constituting the axle of said front wheel, an idler means comprising, an idler sprocket, a means to rotatably support said idler sprocket, a clamping means to clamp said last-mentioned support means to said stem means, a crank means comprising, a shaft portion, leg portions integrally joined to each end of said shaft portion, handle elements mounted on each leg portion, a relatively large sprocket fixedly mounted on said crank means adjacent to one of said leg portions, an adjustable mounting means for said crank means comprising a bearing means to rotatably support said crank means, an adjustable support means for said bearing means providing selective forward and rearward positioning of said crank means pivotally attached to said stem means, a sprocket chain for connecting said sprocket on said front wheel and said relatively large sprocket on said crank means in driving relationship, said improvement constructed and adapted to provide a front wheel drive means having an adjustably positionable crank means, and adapted to prevent interference of the sprocket chain and frame and provide an extended swiveling freedom of the fork with the provision of said idler means to guide and support said chain.

7. In a bicycle having a frame, a rear wheel, a drive means for said rear wheel, a front wheel, a swiveling mounted fork for said front wheel, and a stem means disposed on said front wheel fork, the improvement comprising, in combination, a sprocket mounted on the axle of said front wheel, an idler means comprising, an idler sprocket, a means to rotatably support said idler sprocket on said stem means, a crank means comprising, a shaft portion, leg portions joined to each end of said shaft portion, handle elements mounted on each leg portion, a sprocket mounted on said crank means adjacent to one of said leg portions, an adjustable mounting means for said crank means comprising, bearing means to rotatably support said crank means, an adjustable support means for said bearing means pivotally attached to said stem means providing selective and forward and rearward positioning of said crank means relative to said fork, a sprocket chain for connecting said sprocket on said front wheel and said sprocket on said crank means in driving relationship with said sprocket chain operatively engaging said idler sprocket, said improvement constructed and adapted to provide a front wheel drive means having an adjustably positioned crank means and adapted to prevent interference of the sprocket chain and frame and provide extended swiveling freedom of the fork with the provision of said idler means to guide and support said chain.

References Cited by the Examiner

UNITED STATES PATENTS

| 595,501 | 12/97 | Stoops | 280—234 |
| 2,815,222 | 12/57 | Harrison | 280—261 |

FOREIGN PATENTS

| 1,208 | 1926 | Australia. |
| 22,306 | 1898 | Great Britain. |
| 529,233 | 6/54 | Belgium. |
| 801,759 | 1/51 | Germany. |

A. HARRY LEVY, *Primary Examiner.*